Patented Jan. 5, 1932 1,840,229

UNITED STATES PATENT OFFICE

GUENTHER HAMPRECHT, OF OPPAU, GERMANY, ASSIGNOR TO I. G. FARBENINDUSTRIE AKTIENGESELLSCHAFT, OF FRANKFORT-ON-THE-MAIN, GERMANY

DOUBLE SALTS

No Drawing. Application filed November 22, 1930, Serial No. 497,603, and in Germany November 28, 1929.

The present invention relates to new double salts and a process for their production.

It is well known that the normal nitrates of divalent metals, such as those of magnesium, calcium and zinc, are very hygroscopic and tend to deliquesce. On the other hand, the hydroxy nitrates, i. e. the basic nitrates, of these metals are quite stable and keep well even with free access of air. The basic nitrates or mixtures thereof may be obtained by the action of nitric acid on the metal oxides concerned or more preferably by fusing together the corresponding normal nitrates with metal hydroxides or oxides. The products thus obtained, however, have a comparatively low content of nitrogen, which is objectionable when the products are to be used as fertilizers.

I have now found that nitrogenous products which do not have the said objection are obtained in a simple manner by combining the said basic nitrates with the nitrates of alkali metals such as potassium, or monovalent radicles such as the ammonium or urea radicles, to form double salts. These new double salts are composed in a manner corresponding to the general formula $$Me^{II}(OH)NO_3.Me^{I}NO_3$$

wherein $Me^{II}$ is the divalent metal and $Me^{I}$ indicates an alkali metal or monovalent radicle.

The double salts may be prepared by bringing together the basic nitrate with the nitrate of a monovalent metal or radicle or also mixtures of several of the compounds in aqueous solution or in a melt or by sintering them together at suitable temperatures depending on the nature of the salts treated. It is not necessary to employ a basic nitrate from the start but this may be produced from a normal nitrate and an oxide or hydroxide during the conversion. The formation of the new double salts takes place already at room temperature, but in order to obtain a rapid conversion, it is advisable to work at elevated temperatures.

By spraying the melts or concentrated solutions of the new double salts fertilizers capable of being readily scattered may be obtained which may be employed alone or in admixture with other substances with or without fertilizing action.

The following examples will further illustrate the nature of this invention, but the invention is not restricted to these examples. The parts are by weight.

Example 1

101 parts of potassium nitrate are fused for example at about 250° C. with 119 parts of basic calcium nitrate. When the melt is cooled, the compound $Ca(OH)NO_3.KNO_3$ crystallizes out at 190° C.

Instead of starting with ready-made basic calcium nitrate the double salt may be prepared in one operation by introducing quicklime into an aqueous solution of calcium nitrate, adding the calculated amount of potassium nitrate, evaporating off the water and spraying the fused mass.

Example 2

80 parts of ammonium nitrate are mixed with 119 parts of basic calcium nitrate and the mixture is heated carefully at least to 80° C. When the mixture is cooled to 50° C., crystals of the compound $Ca(OH)NO_3.NH_4NO_3$ are obtained.

Example 3

123 parts of urea nitrate are fused at about 100° C. with 119 parts of basic calcium nitrate. The compound $$Ca(OH)NO_3.CO(NH_2)_2HNO_3$$

crystallizes out at 90° C.

Example 4

103 parts of basic magnesium nitrate are fused with 101 parts of potassium nitrate. On cooling, the compound $$Mg(OH)NO_3.KNO_3$$

crystallizes at 180° C.

Example 5

101 parts of potassium nitrate are fused with 167 parts of basic strontium nitrate. When the melt is cooled to 275° C. the compound $Sr(OH)NO_3.KNO_3$ crystallizes out.

*Example 6*

101 parts of potassium nitrate are fused with 216 parts of basic barium nitrate. On cooling, the compound Ba(OH)NO$_3$.KNO$_3$ crystallizes out at 265° C.

*Example 7*

101 parts of potassium nitrate are fused with 144 parts of basic zinc nitrate. On cooling to 195° C., the compound $$Zn(OH)NO_3.KNO_3$$

crystallizes out.

What I claim is:—

1. As new articles of manufacture, the double salts corresponding to the general formula Me$^{II}$(OH)NO$_3$.Me$^I$NO$_3$ wherein Me$^{II}$ is a divalent metal and Me$^I$ indicates an alkali metal or monovalent radicle.

2. As new articles of manufacture, the double salts corresponding to the general formula Me$^{II}$(OH)NO$_3$.KNO$_3$ wherein Me$^{II}$ is a divalent metal.

3. As new articles of manufacture, the double salts corresponding to the general formula Ca(OH)NO$_3$.Me$^I$NO$_3$ wherein Me$^I$ indicates an alkali metal or monovalent radicle.

4. As a new article of manufacture, the double salt corresponding to the general formula Ca(OH)NO$_3$.KNO$_3$.

5. The process of producing new double salts which comprises heating a basic nitrate of a divalent metal with a compound corresponding to the general formula Me$^I$NO$_3$ wherein Me$^I$ indicates an alkali metal or monovalent radicle.

6. The process of producing new double salts which comprises fusing a basic nitrate of a divalent metal with a compound corresponding to the general formula Me$^I$NO$_3$ wherein Me$^I$ indicates an alkali metal or monovalent radicle.

7. The process of producing new double salts which comprises fusing basic calcium nitrate with a compound corresponding to the general formula Me$^I$NO$_3$ wherein Me$^I$ indicates an alkali metal or monovalent radicle.

8. The process of producing a new double salt which comprises fusing basic calcium nitrate with potassium nitrate.

In testimony whereof I have hereunto set my hand.

GUENTHER HAMPRECHT.